(12) United States Patent
Tijink et al.

(10) Patent No.: US 9,291,465 B2
(45) Date of Patent: Mar. 22, 2016

(54) METHOD FOR UPDATING A DIGITAL ROAD MAP

(71) Applicant: Kapsch TrafficCom AG, Vienna (AT)

(72) Inventors: Jasja Tijink, Breitenfurt (AT); Thomas Scheider, Gerasdorf (AT); Franz Weimann, St. Johann im Pongau (AT); Sören Schrödl, Mödling (AT)

(73) Assignee: Kapsch TrafficCom AG, Vienna (AT)

( * ) Notice: Subject to any disclaimer, the term of this patent is extended or adjusted under 35 U.S.C. 154(b) by 77 days.

(21) Appl. No.: 13/965,576

(22) Filed: Aug. 13, 2013

(65) Prior Publication Data

US 2014/0046582 A1    Feb. 13, 2014

(30) Foreign Application Priority Data

Aug. 13, 2012   (EP) .................................... 12180293

(51) Int. Cl.
*G06F 19/00*       (2011.01)
*G01C 21/34*      (2006.01)
*G01C 21/30*      (2006.01)
*G01C 21/32*      (2006.01)

(52) U.S. Cl.
CPC ................ *G01C 21/34* (2013.01); *G01C 21/30* (2013.01); *G01C 21/32* (2013.01)

(58) Field of Classification Search
CPC ........ G01C 21/28; G01C 21/30; G01C 21/32; G01C 21/34
USPC .......................... 701/445–447, 469, 475, 412
See application file for complete search history.

(56) References Cited

U.S. PATENT DOCUMENTS

2007/0250263 A1\* 10/2007 Yamada ................. B60Q 1/085
                                                                   701/408
2010/0106405 A1\*  4/2010 Hu ......................... G01C 21/00
                                                                   701/467

(Continued)

FOREIGN PATENT DOCUMENTS

DE         10030932 A1     1/2002
EP          1736932    \*    6/2006
WO       2007065725 A1    6/2007
WO       2010129192 A1   11/2010

OTHER PUBLICATIONS

Robl (EP1736932) machine translation.\*

(Continued)

*Primary Examiner* — Adam Tissot
(74) *Attorney, Agent, or Firm* — Fiala & Weaver P.L.L.C.

(57) ABSTRACT

Methods are provided for updating a digital road map in which road segments having segment lengths are stored. At least two vehicles are equipped with at least one respective onboard unit generating position readings. If a first set of position readings of a first onboard unit can be associated with a road segment, a first path length is determined based on the position readings of the first set. If a second set of position readings of a second onboard unit can be associated with the road segment, a second path length is determined based on the position readings of the second set. An average path length is calculated based on at least the first and second path lengths. If the average path length deviates from the stored segment length, the average path length is stored as an updated stored segment length of this road segment in the digital road map.

20 Claims, 7 Drawing Sheets

(56) References Cited

U.S. PATENT DOCUMENTS

2012/0059578 A1* 3/2012 Venkatraman ......... G01C 21/20
                                                        701/411
2012/0116678 A1* 5/2012 Witmer .................. G01C 21/32
                                                        702/5

OTHER PUBLICATIONS

Extended European Search Report received for application No. 12180293.8, dated Jan. 22, 2013, 6 pages.

* cited by examiner

METHOD FOR UPDATING A DIGITAL ROAD MAP

CROSS-REFERENCE TO RELATED APPLICATION(S)

This application claims priority to European Patent Application No. 12 180 293.8, filed on Aug. 13, 2012, the entirety of which is incorporated by reference herein.

BACKGROUND

1. Technical Field

The present application relates to a method for updating a digital road map which represents a road system and in which road segments having segment lengths are stored.

2. Background Art

Digital road maps are required in road toll systems, for example, which are based on a map matching process. In such systems, vehicles carry onboard units (OBUs), which continually generate readings of their own positions, so as to compare these to the digital road map and determine the respective nearest road segments as having been driven. The segment lengths of the driven road segments are then added so as to calculate and thereafter impose tolls on the length of the path traveled by the vehicle.

So as to generate the position readings, an OBU determines its own location, for example in a global navigation satellite system (GNSS) or in a public land mobile network using several stationary transceivers. Depending on the configuration, the OBU either transmits the position readings to a central unit of the road toll system, where the map matching is carried out ("thin-client OBU"), or the digital road map is stored directly in the OBU, which carries out the map matching itself ("thick-client OBU").

Map matching methods have the drawback that the accuracy of the path length determination is limited by the segment resolution of the digital road map. The lengths of the paths in fact traveled by a vehicle frequently deviate from the lengths of the digitally modeled road segments: for example in the region of curves, intersections or traffic circles, the path actually driven is dependent on the driving direction of the vehicle, while the segment lengths of the digital road map are generally modeled independently thereof. Construction sites, temporary detours and the like also cause errors in the path lengths of the vehicles determined by way of map matching.

BRIEF SUMMARY

Aspects of the present application are based on the new finding that it is desirable to be able to adjust the digital road map of a map matching method adaptively to temporary changes of the road system or particular driving habits of the users.

For this purpose, the patent application creates a method for updating a digital road map which represents a road system and in which road segments having segment lengths are stored, comprising:

equipping at least two vehicles moving about in the road system with at least one respective onboard unit generating position readings;

if a first set of position readings of a first onboard unit can be associated with a road segment of the digital road map, determining a first path length based at least on mutual distances of consecutive position readings of the first set;

if a second set of position readings of a second onboard unit can be associated with the same road segment, determining a second path length based at least on mutual distances of consecutive position readings of the second set;

calculating an average path length for this road segment based on at least the first and second path lengths; and if the calculated average path length deviates from the stored segment length of this road segment by at least a predetermined minimum amount and/or by no more than a predetermined maximum amount, storing the average path length as an updated stored segment length of this road segment in the digital road map.

The digital road map is thus dynamically adapted to local variances, even those of a temporary nature, for example due to construction sites, detours or the like, and more particularly based on averaged path length messages from vehicles that measure the segments locally with the aid of their onboard units.

The corrected updated segment lengths can then, in turn, be used by the same—or different—vehicles for map matching purposes, so as to determine driven road segments and the lengths thereof and, based thereon, be able to calculate a path-dependent road toll, for example. According to a first variant of the method, the path length traveled by the first or second vehicle is thus determined based on at least the updated stored segment length; according to an alternative variant of the method, the path length traveled by a third vehicle is determined based on at least the updated stored segment length if position readings of a third onboard unit of the third vehicle can be associated with this road segment.

So as to minimize measurement errors at the segment boundaries due to scarce or sparse position readings, the respective path length may be determined based on the aforementioned mutual distances, plus the distances of the first and last position readings of the respective set from the respective neighboring segment boundary.

The position readings may be transmitted from the onboard units to a central unit, where the digital road map is stored and updated. The map matching can also be carried out directly at the central unit, or the digital road map is distributed to thick-client OBUs for decentralized map matching processes. This central unit itself can be the billing center of a road toll system or it may only be a map matching proxy provided upstream thereof, which is dedicated to the map matching of position readings of thin-client OBUs.

In a further embodiment, the first and second sets are associated with the road segment by locating the respective nearest road segment. The nearest road segment can, for example, be one from which the position readings in each case have the shortest normal distance.

As an alternative, the digital road map may include a respective separate road segment for different driving directions on a road, and the association can take place by locating the respective nearest road segment having the same driving direction. Especially for road segments with curves, a drastically different segment length may result depending on the driving direction, with the segment being able to be automatically measured in this way and considered in map matching.

In an advantageous variant, the mutual distances are determined directly from the position readings. In an alternative variant, the onboard unit generates a related pair comprising speed and measuring time for each position reading, and the mutual distances of two consecutive position readings are determined based on the speed at the first of the two position readings and the difference of the measuring times of the two position readings. Because particularly precise values are generated for the speed and time, in particular in satellite navigation receivers, the latter variant allows the distances of consecutive position readings to be determined particularly precisely.

Another embodiment is characterized in that the onboard units also generate a related position quality index for each position reading, and only those position readings are used for determining a path length, the position quality index of which exceeds a predetermined first threshold value. "Outlier" readings can thus be suppressed, and the digital road map is only updated based on "good" position readings.

In a further embodiment, it is also possible to form a set quality index based on the number, or the position quality indices, of position readings of an onboard unit that can be associated with a road segment, and to determine a path length based on these positions readings, or to use these readings for calculating the average path length, only if the set quality index exceeds a predetermined second threshold value. An additional, second quality criterion is thus established for the use of readings of an onboard unit: only if an entire set of position readings meets a common quality index (set quality index) are these readings used to calculate the path length and can be included in the calculation of the average path length as a basis for updating the digital road map.

In an advantageous embodiment, the set quality index is determined based on the position quality indices of the set as an average thereof. As a result, the position quality index of each position reading that is considered in the set is included in the set quality index. As an alternative, the set quality index can be determined as a ratio of the number of position readings that are considered in the set to the sum of considered plus not-considered position readings. In this way, measuring inaccuracies of the position readings that are not considered are also indirectly taken into account and thus form a broader basis for a decision.

If desired, the position readings can be generated by way of a mobile radio receiver of the onboard unit by localization in a public land mobile network. It may be particularly advantageous for the position readings to be generated by way of a satellite navigation receiver of the onboard unit by localization in a global navigation satellite system (GNSS).

The position quality index can be determined in various variants, which may also be combined with each other or employed consecutively. According to a first embodiment, which is suited specifically for GNSS-based OBUs, the satellite navigation receiver issues a related DOP ("dilution of precision") value, such as an HDOP ("horizontal dilution of precision") value, for each position reading as a basis for the position quality index thereof DOP and HDOP values are natively provided for every position reading by many commercially available satellite navigation receivers and indicate the geometric relationships of the current satellite constellation, which here serve as a basis of a possible range of the respective position reading.

In an alternative or supplemental embodiment, the position quality index of a position reading is generated depending on the distance thereof from a nearest road segment of the digital road map. Such a procedure corresponds to a simplified map matching method, in which no complex plausibility checks are carried out based on neighboring position readings, but only the distance from the nearest road segment is determined. The robustness of the map matching method is thus already incorporated in the method as part of the generation of the position quality index, so that, for example, individual position readings located far off ("outliers") are not taken into consideration. This embodiment can be directly implemented in thick-client OBUs, where the digital road map is present in the OBU, and is therefore particularly advantageous. However, it is also possible to use thin-client OBUs for this purpose, which outsource this step to an external map matching proxy.

In a further alternative or additional embodiment, the position quality index of a position reading is generated depending on the distance thereof from an expected value, which is formed for this position reading by way of interpolation based on neighboring position readings in the sequence. Isolated "outliers" can thus be eliminated from the method without map matching. It is also possible to use more than two neighboring position readings for interpolation, in particular for interpolations of a higher (non-linear) order, which increases the accuracy.

Alternatively, the position quality index of a position reading can be generated depending on the distance thereof from an expected value, which is formed for this position reading by way of extrapolation based on preceding position readings in the sequence. Contrary to interpolation, subsequent position readings do not have to be known for this purpose, so that this variant is particularly suitable for real-time implementation. Again, more than one preceding position reading may be used for extrapolation purposes, in particular for extrapolations of a higher (non-linear) order or, for example, when employing a Kalman filter for extrapolation, which again increases the accuracy.

Today, many satellite navigation receivers can natively determine their respective speed and movement direction as well as their acceleration with high precision. In such cases, it is particularly advantageous if the satellite navigation receiver issues a related movement vector for each position reading, the vector being used to extrapolate the expected value. Such a movement vector that is formed of the speed and movement direction—optionally using the acceleration value—allows a particularly precise estimation of the expected value for the following position reading and provides a good starting point for generating the position quality index.

As an alternative, the onboard unit may receive a movement reading from a vehicle sensor for every position reading, the reading being used to extrapolate the expected value. The movement reading may be transmitted by a speed or inertia sensor, optionally also by a tachograph of the vehicle, and may also be a combination of the readings from such sensors. This likewise results in a precise estimation of the expected value, and more particularly without being dependent on a GNSS.

BRIEF DESCRIPTION OF THE DRAWINGS/FIGURES

Embodiments will be described in more detail hereafter with reference to the accompanying drawings. In the drawings.

Embodiments will now be described with reference to the accompanying drawings.

DETAILED DESCRIPTION

Figure 1:
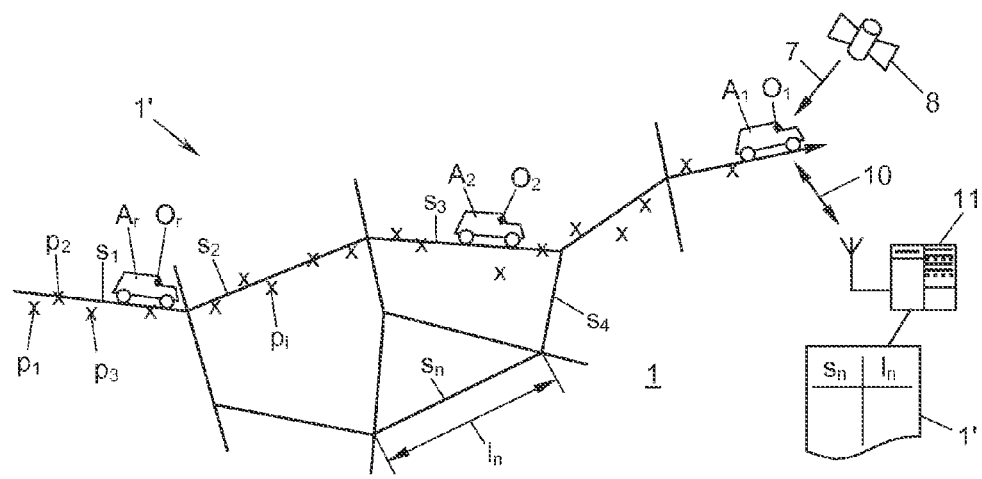
FIG. 1 shows a schematic top view onto a section of a road system modeled by a digital road map, according to an example embodiment

FIG. 1 shows a road system 1, which is modeled in the form of a digital road map 1' comprising a network graph of road segments $s_1, s_2, \ldots$, or in general terms $s_n$. Several vehicles $A_1, A_2, \ldots$, or in general terms $A_r$, which are shown by way of example, are moving about in the road system 1 and carry a respective onboard unit (OBU) $O_1, O_2, \ldots$, or in general terms $O_r$, which is capable of locating itself in the road system 1.

In addition to a microprocessor 4 and a memory 5, each OBU $O_r$ comprises a satellite navigation receiver 6 for this purpose (FIG. 2), by way of which the OBU receives navigation signals 7 of a global navigation satellite system 8 (GNSS) such as GPS (global positioning system), GLONASS (Global Navigation Satellite System), GALILEO or the like, and based thereon continually generates readings of its own position ("position fixes") $p_1, p_2, \ldots$, or in general terms $p_i$ (more precisely: $p_{i,r}$; however, to simplify matters, the annexation of the OBU-specific index r will be dispensed with hereafter when speaking of an OBU $O_r$). Alternatively, the OBU $O_r$ could also determine the position readings $p_i$ thereof in another manner, for example by way of radio triangulation, cell identifier evaluation or the like in a public land mobile network (PLMN) such as a GSM, UMTS or another 3G/4G/5G network.

Figure 2:
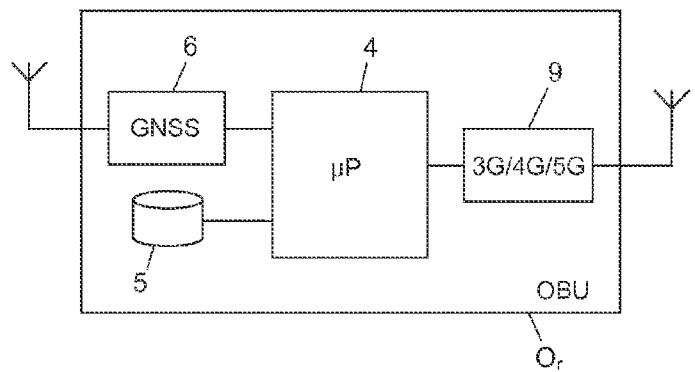
FIG. 2 is a schematic block diagram of an onboard unit suitable for use in the method, according to an exemplary embodiment.

According to FIG. 2, each OBU $O_r$ is also equipped with a transceiver 9, by way of which the OBU can transmit the position readings $p_i$ via a mobile communication network 10 to a toll central unit or center 11. The mobile communication network 10 can be of the type that is described, for example a GSM, UMTS or another 3G/4G/5G network, or a network of geographically distributed short-range radio beacons, for example according to the wireless access for vehicular environments (WAVE) standard, or even an ad-hoc network of mobile network nodes, for example a vehicular ad-hoc network (VANET). As an alternative or in addition, the position readings $p_i$ could also be derived from such networks.

In the toll center 11, those road segments $s_{n,r}$ on which the vehicle $A_r$ has driven can be determined, for example based on the position readings $p_i$ thus obtained by way of map matching with the digital road map 1'. The map matching could also be carried out in a separate map matching proxy provided upstream of the toll center 11, or directly in the OBU $O_r$ if the digital road map is stored in the memory 5. Based on the known segment lengths $l_n$ of the determined road segments $s_{n,r}$ which are stored in the digital road map 1', it is then possible to calculate the length $l_r$ of the path traveled by the vehicle $A_r$ in the road system 1.

Figure 3:
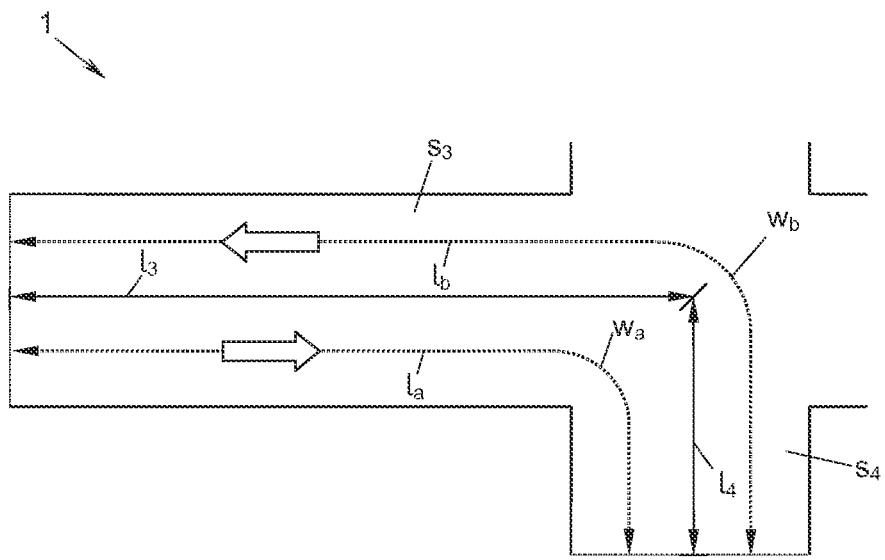
FIG. 3 is an enlarged detail view of one of the turns of the road system of FIG. 1, according to an example embodiment.

FIG. 3 illustrates one of the problems of such path length determination by map matching. Because of construction sites, temporary detours, curves, which drivers frequently "cut" (shorten), or simply because of the limited resolution of digital road maps 1', which frequently model multi-lane road sections or sections with opposing traffic only with a single road segment $s_n$, the path lengths $l_a, l_b$ of the paths $w_a, w_b$ traveled by drivers in practical experience deviate from the segment lengths $l_n$ (here: $l_3, l_4$) stored therefor in the road map 1'. The method described hereafter takes this problem into consideration so as to achieve a more accurate path length description for map matching methods.

Figure 5:
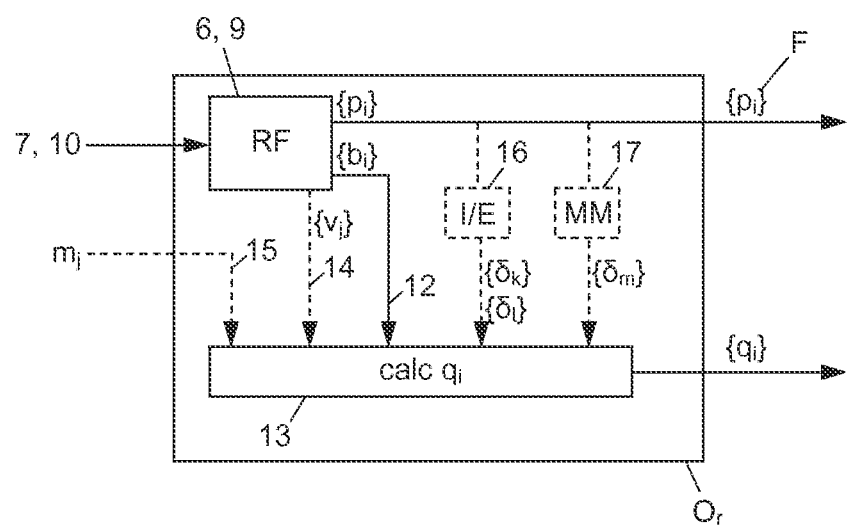
FIGS. 5 and 6 show different variants for generating a position quality index for a position reading, once in the form of a functional block diagram (FIG. 5) and once based on exemplary position readings in the road system (FIG. 6), according to example embodiments.
Figure 4A:
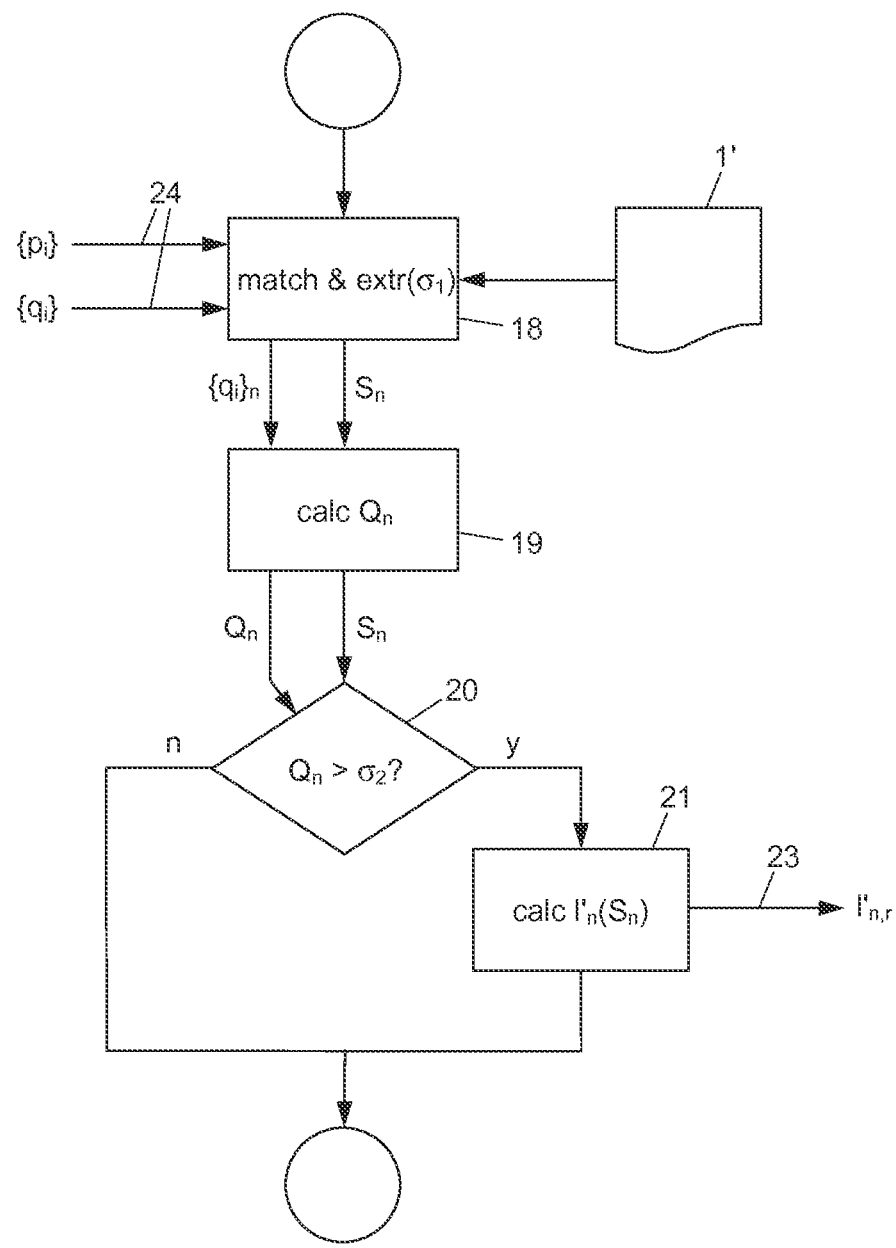
FIG. 4a is a flowchart of a part of the method, in which position and set quality indices are used to determine the path length of an OBU, according to an example embodiment.
Figure 4B:
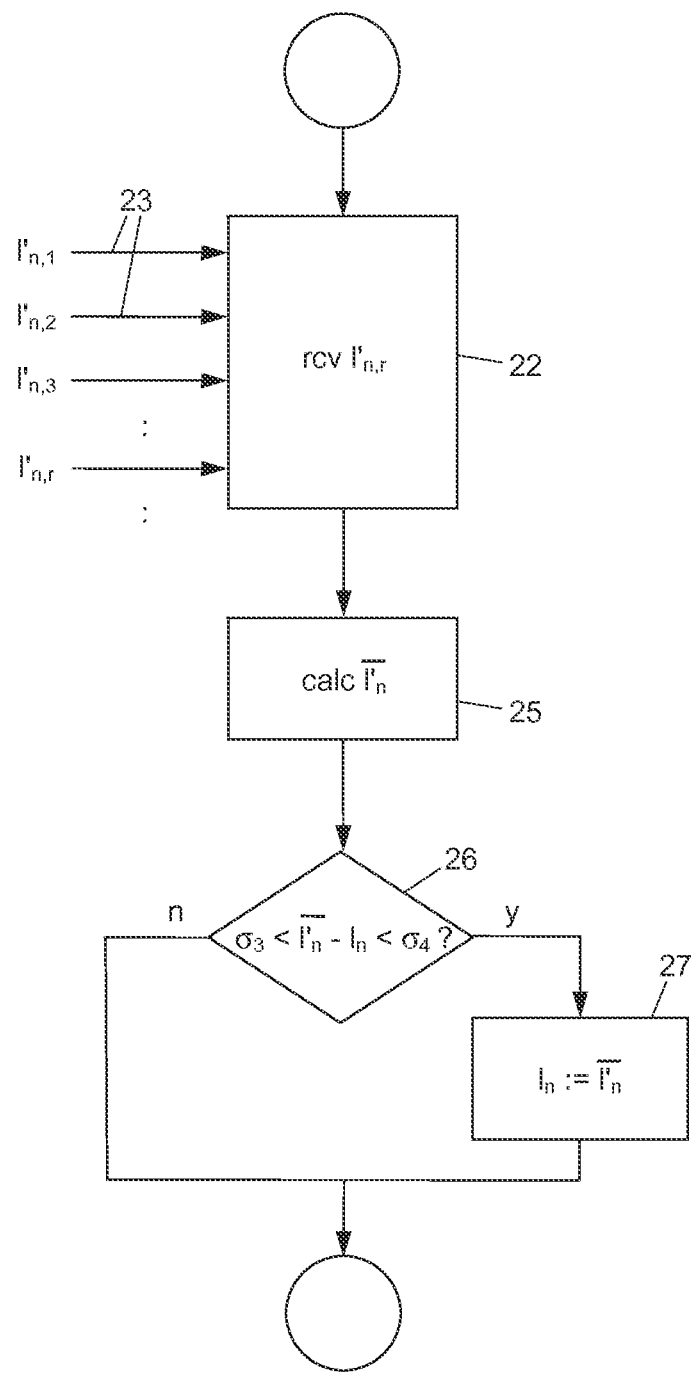
FIG. 4b shows a flowchart of a part of the method, in which the segment length of a road segment in the digital map is updated, according to an example embodiment.
Figure 6:
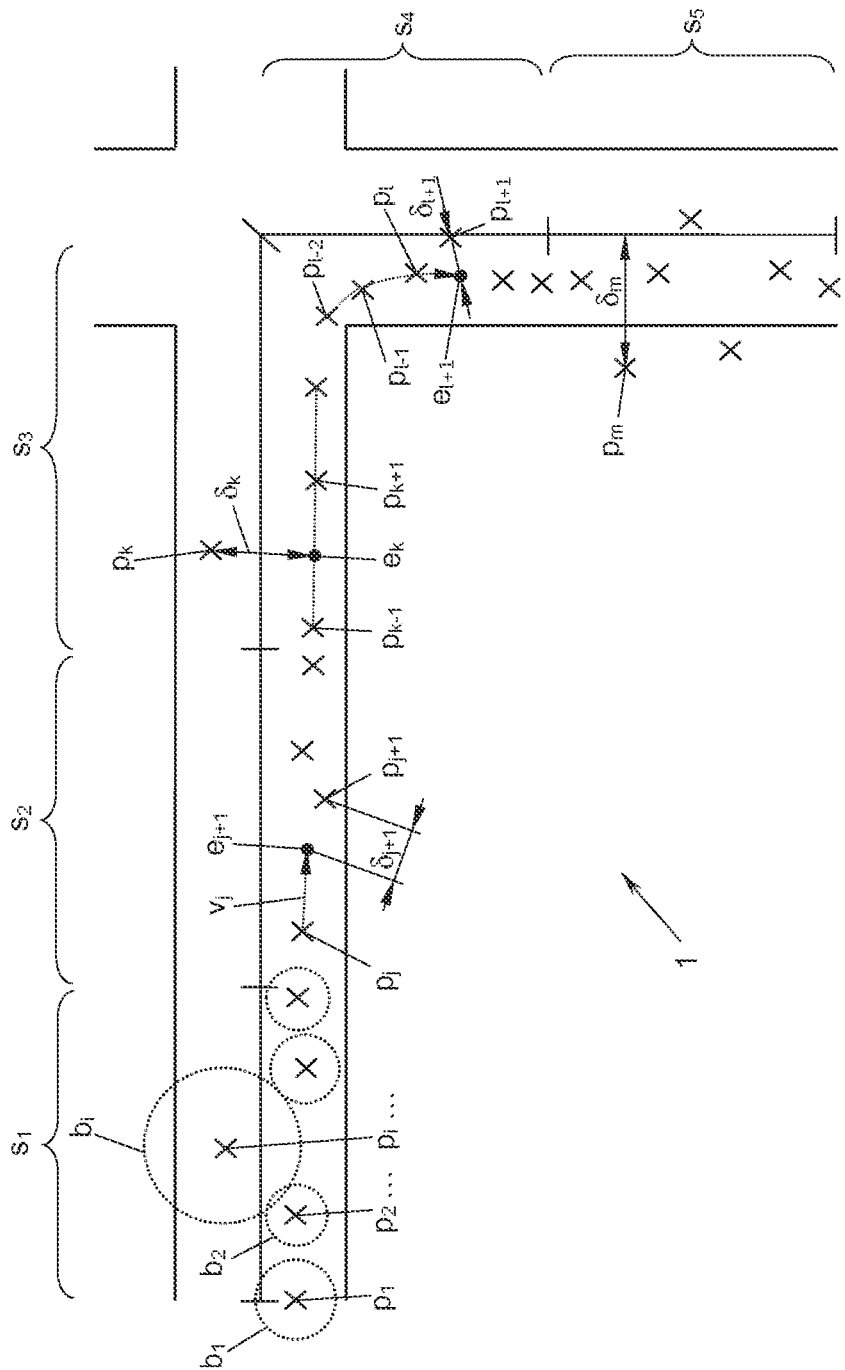

FIGS. 4a and 4b show the method in different phases and FIGS. 5 to 8 show them in detail. The method phases of FIGS. 4a and 5 to 8 can take place both entirely in an OBU $O_r$ or partially in an OBU $O_r$ and partially in a toll center 11 and/or a map matching proxy provided upstream thereof; the method phase of FIG. 4b can take place in the toll center 11 and/or a map matching proxy provided upstream thereof In optional embodiments, the method of FIGS. 4a and 4b uses a special configuration of the OBUs $O_r$, according to which these generate a respective related quality index $q_i$ of the position reading $p_i$ for each position reading $p_i$, which is to say two mutually associated sequences $\{p_i\}$ (hereafter also referred to as F) and $\{q_i\}$ of position readings $p_i$ and position quality indices $q_i$ or a sequence $\{(p_i, q_i)\}$ of pairs of position readings $p_i$ and position quality indices $q_i$. FIGS. 5 and 6 show a variety of variants of generating a position quality index $q_i$ for a position reading $p_i$, wherein each of the exemplary road segments $s_1$ to $s_5$ of FIG. 5 shows a different variant.

As is shown in road segment $s_1$ of FIG. 6, a first option is that an OBU $O_r$ uses a satellite navigation receiver 6, which on its own ("intrinsically") provides a measurement error value or range value $b_i$ for each position reading $p_i$, which in the simplest case can directly be used as a basis for the position quality index $q_i$, for example in the form $q_i \hat{=} 1/b_i$. Such range values $b_i$ can, for example, be so-called DOP ("dilution of precision"), PDOP ("positional DOP"), TDOP ("time DOP"), GDOP ("geometric DOP") or HDOP ("horizontal DOP") values, as they are generated by commercially available GNSS receivers, for example GPS receivers, based on the current satellite constellation and the resulting measurement errors.

If an OBU $O_r$ utilizes a mobile communication network transceiver 9 for position determination instead of (or in addition to) the satellite navigation receiver 6, the range value $b_i$ could, for example, also be intrinsically generated by the same, for example based on the currently receivable base stations of the mobile communication network 10 or the current localization accuracy of corresponding mobile communication network services ("location-based services").

Path 12 of FIG. 5 is a schematic illustration of such a direct use of the range values $b_i$ of the receivers 6, 9 for generating the position quality indices $q_i$ in a block 13.

A second variant of generating the position quality indices $q_i$ is illustrated in road segment $s_2$ of FIG. 6. In this variant, the satellite navigation receiver 6 also supplies a respective current movement vector $v_j$ for each position reading $p_j$ (see path 14 of FIG. 5), the vector comprising the direction and speed $g_j$ of an OBU $O_r$, and perhaps also the acceleration thereof, wherein the values can also be determined with particularly high precision by commercially available satellite navigation receivers 6, for example by way of Doppler measurements using the received satellite navigation signal 7. Commercially available mobile communication receivers 9 could also determine such a movement vector $v_j$, for example based on Doppler measurements using the signals received from the surrounding base stations. In both variants, the movement vector $v_j$ could additionally or exclusively be determined by way of an inertial measurement unit (IMU) in conjunction with an electronic compass system, for example.

Proceeding from a current position reading $p_j$, it is possible, based on the current movement vector $v_j$, to estimate (extrapolate) an expected value $e_{j+1}$ for the respective next position reading $p_{j+1}$ of the sequence F or $\{p_i\}$ and the deviation $\delta_{j+1}$ of the next position reading $p_{j+1}$ from the expected value $e_{j+1}$ again constitutes a range index—assuming, for example, that a movement vector $v_j$ determined by way of Doppler measurement has very high accuracy—that can serve as a basis for calculating the position quality index $q_{j+1}$ of the position reading $p_{j+1}$ in block 13, for example in the form of $$q_{j+1} \triangleq 1/\delta_{j+1}.$$

As an alternative (or in addition) to the movement vector $v_j$, an OBU $O_r$ could also receive movement values $m_j$ from a vehicle sensor of the vehicle $A_r$, for example a speed or inertia sensor, tachometer, odometer, tachograph or the like, see path 15 of FIG. 5, wherein these values can also be used to determine an expected value $e_{j+1}$ for the next position reading $p_{j+1}$ and thus the deviation $\delta_{j+1}$ and the position quality index $q_{j+1}$.

Another variant for creating the position quality index $q_i$ is shown based on road segments $s_3$ and $s_4$ of FIG. 6 and block 16 of FIG. 5, in particular by way of interpolation or extrapolation of expected values $e_k$, $e_{l+1}$ based on the sequence F of position readings $p_i$. In road segment $s_3$, an expected value $e_k$ is formed by way of example by interpolation between two position readings $p_{k-1}$ and $p_{k+1}$ adjoining the position reading $p_k$, and the deviation $\delta_k$ of the position reading $p_k$ is determined. In road segment $s_4$, an expected value $e_{l+1}$ is formed for a next position reading $p_{l+1}$ by way of extrapolation based on preceding position readings ..., $p_{l-2}$, $p_{l-1}$, $p_l$, and the deviation $\delta_{l+1}$ of the position reading $p_{l+1}$ is again determined.

The interpolation or extrapolation can also be carried out in each case based on two or more preceding or subsequent position readings $p_i$ of the sequence F, and both linear interpolations and extrapolations as well as those of higher orders ("wavelet fitting", "spline fitting") may be considered and carried out in a corresponding interpolating or extrapolating unit 16 of FIG. 5.

Based on the deviations $\delta_k$, $\delta_l$, it is then again possible in block 13 to determine the corresponding position quality indices $q_i$ (here: $q_k$, $q_l$), for example in the form of $$q_k \triangleq 1/\delta_k \text{ and } q_l \triangleq 1/\delta_l.$$

Road segment $s_5$ of FIG. 6 and block 17 of FIG. 5 show a variant in which the distance or the deviation $\delta_m$ from the nearest road segment $s_k$, here $s_5$, is determined for every position reading $p_m$ by map matching comparison with the digital road map 1'. When using a thick-client OBU, the map matching of block 17 can be carried out in the OBU $O_r$; in the case of a thin-client OBU, this step may be outsourced to an external map matching proxy or the toll center 11. The deviation $\delta_m$ can then again be used to determine the position quality index $$q_m \triangleq 1/\delta_m$$

for the position reacting $p_m$ in block 13.

Of course, the position quality index $q_i$ in block 13 can also be calculated using any arbitrary function F, for example the weighted sum, of the range values $b_i$ and deviations $\delta_j$, $\delta_k$, $\delta_l$, $\delta_m$, which is to say $q_i = f(b_i, \delta_j, \delta_k, \delta_l, \delta_m)$.

The values obtained via paths 12 and 15 to 17 could optionally also be evaluated in multiple stages in block 13 so as to generate the quality index $q_i$, for example initially with the aid of the range values $b_i$ and, if these are sufficiently small, subsequently based on the expected values $e_i$, $e_j$, $e_k$, $e_l$. It would also be possible to generate the position quality indices $q_i$ differently for different position readings p for example if, during the GNSS localization, DOP values existed that are not created with intermediate mobile communication localization, or if the position quality indices $q_i$ are formed based on manufacturer-specific quality indicators that can be generated by commercially available GNSS receivers.

To come back to FIG. 4a, the figure shows that section of the method which is carried out in each OBU $O_r$—or in the central unit 11 (or an upstream proxy) for each OBU $O_r$—and is used to determine a path length $l_n'$ traveled in the road segment $s_n$ by the OBU $O_r$ for a road segment $s_n$ based on the position readings $p_i$ generated by an OBU $O_r$. To this end, in a first step 18, the position readings $\{p_i\}$ of an OBU $O_r$ are associated ("matched") with the respective neared road segment $s_n$ of the digital road map 1'. The association is carried out, for example, by searching for that road segment $s_n$ for every position reading $p_i$ from which the distance $\delta_m$, for example the normal distance, is minimal. In addition, it may be provided for in the association that the driving direction of the vehicle $A_r$ or of the OBU $O_r$ is also taken into consideration, which is to say the history or chronological sequence of the position readings $p_i$ in the sequence $\{p_i\}$ if the road segments $s_n$ in the digital road map 1' are dedicated to particular driving directions. It is thus possible, for example, to store a dedicated road segment $s_n$, including directional information, for a road of the road system 1 that has two lanes for opposing driving directions and, in the association use only the nearest road segment $s_n$ that corresponds to the driving direction of the vehicle $A_r$ or of the OBU $O_r$.

Figure 7:
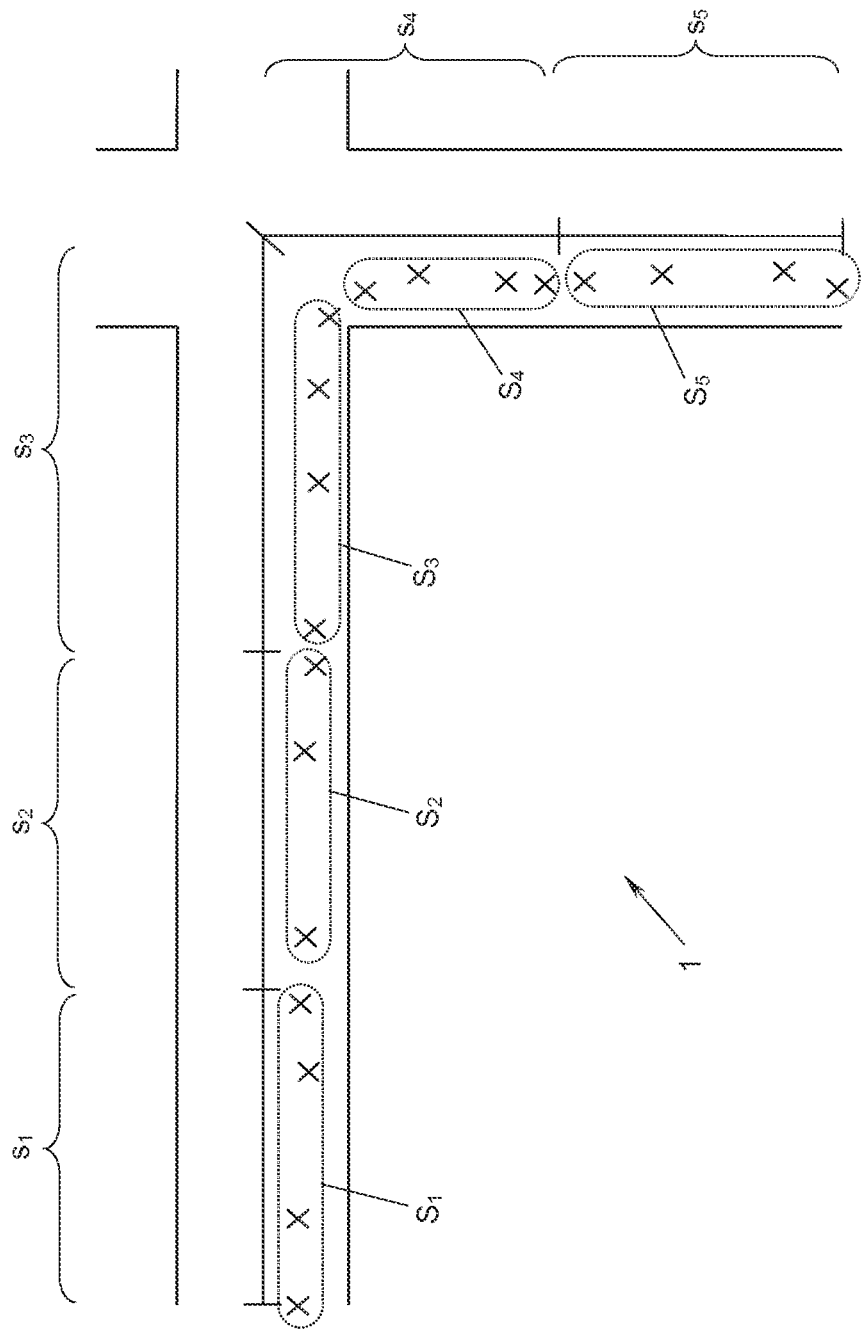
FIG. 7 shows in detail a step of extracting sets of position readings in keeping with the variants of FIGS. 5 and 6, according to an example embodiment.

The position readings $p_i$ that can be associated, or that are associated, with a road segment $s_n$ in this way are thereafter regarded or extracted as a set $S_n$ of position readings $p_i$ from the sequence F or $\{p_i\}$. In this extraction, it may optionally be provided that position readings $p_i$, the position quality indices $q_i$ of which do not achieve or fall below a predetermined first threshold value $\sigma_1$, are not included in the sets $S_n$, which is to say they are not considered. FIG. 7 shows the result of step 18 for the exemplary position readings of FIG. 6.

As is shown in FIG. 7, the position reading $p_i$ from road segment $s_1$ of FIG. 6 that was not taken into consideration in set $S_1$ was the reading, the large range $b_i$ of which had resulted in a position quality index $q_i$ smaller than the threshold value $\sigma_1$. Likewise, the exemplary position readings $p_{j+1}$, $p_k$, $p_{l+1}$ of FIG. 6 were not considered in sets $S_2$, $S_3$ and $S_4$ because the deviations $\delta_{j+1}$, $\delta_k$, $\delta_{l+1}$ thereof from the respective expected values $e_{j+1}$, $e_k$, $e_{l+1}$ was large and the position quality indices $q_{j+1}$, $q_k$, $q_{l+1}$ thereof were thus smaller than the threshold value $\sigma_1$. The exemplary position reading $p_m$—in addition to others—from road segment $s_5$ of FIG. 6 was not included in set $S_5$, since the large distance $\delta_m$ of this value from road segment $s_5$ had resulted in a position quality index $q_m$ that did not reach the threshold value $\delta_1$.

The sets $S_n$ of position readings $p_i$ exceeding the threshold value $\sigma_1$ that were extracted in step 18 are then supplied, together with the position quality indices $\{q_i\}_n$ associated with sets $S_n$—to a method step 19, in which a set quality index $Q_n$ is determined for every set $S_n$, in particular in the following manner.

In one embodiment, the set quality index $Q_n$ is determined based on the respective position quality indices $q_i$ of the position readings $p_i$ included in set $S_n$, for example as an average or a weighted sum thereof, for which purpose all methods known in mathematics or statistics for linking reading are suited.

In a simplified embodiment, the set quality index $Q_n$ is formed only of the number A of position readings $p_i$ that are included in set $S_n$, for example the absolute number of position readings $p_i$ in set $S_n$ or a "relative" number in relation to the original position readings $p_i$ of the sequence F, which is to say as a ratio of the number of position readings $p_i$ considered in set $S_n$ to the sum of position readings $p_i$ considered and not considered in set $S_n$. To this end, it is also possible to specify a minimum number of position readings $p_i$ in set $S_n$, below which the set quality index $Q_n$ must be set to zero.

The sets $S_n$ and the set quality indices $Q_n$ thereof are then supplied to a comparison step 20, in which the set quality index $Q_n$ of every set $S_n$ is compared to a predetermined second threshold value $\sigma_2$. If the set quality index $Q_n$ exceeds the second threshold value $\sigma_2$, which means that the quantity or overall quality of the position readings $p_i$ of the $S_n$ is sufficiently good, the process branches off to a calculating step 21 (branch "y"), in which the path traveled by the vehicle $A_r$ in the road segment $s_n$ is determined based on the mutual distances $a_i$ of the consecutive position readings $p_i$ of set $S_n$, see for example FIG. 8:

$$l'_1 = a_1 + a_2 + a_3$$

$$l'_3 = a_i + a_{i+1} + a_{i+2}$$

$$l'_4 = a_{i+3} + a_{i+4} + a_{i+5}$$

or in general terms $$l'_n = \sum_i a_{i,n}$$

or more precisely (written with the OBU-specific index r):

$$l'_{n,r} = \sum_i a_{i,n,r}$$

Figure 8:
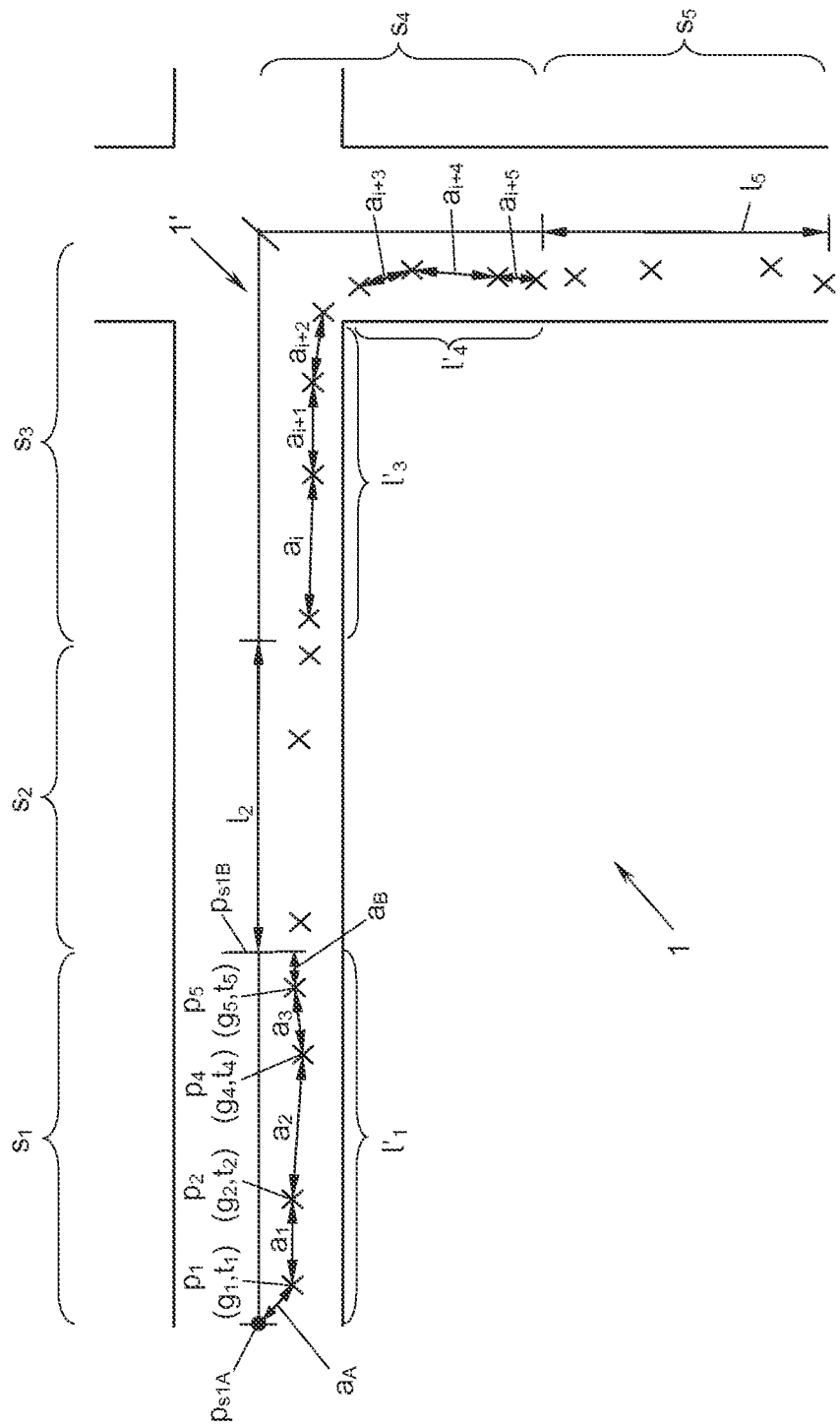
FIG. 8 shows in detail a set quality-dependent path length determination based on the example of FIGS. 5 to 7, according to embodiments.

This is shown in FIG. 8 by way of example for road segments $s_1$, $s_3$ and $s_4$ and for sets $S_1$, $S_3$ and $S_4$, the set quality indices $Q_1$, $Q_3$ and $Q_4$ of which exceeded the threshold value $\sigma_2$. The length $l'_1$ of the path traveled in road segment $s_1$ and set $S_1$ here follows from the sum of the mutual distances $a_1$, $a_2$ and $a_3$ of the consecutive position readings $p_1$, $p_2$, $p_4$ and $p_5$ of set $S_1$, which is to say by not taking into consideration the position reading $p_3$ ($p_i$ in FIG. 6) that was already excluded in step 18.

So as to minimize measurement errors at the segment boundaries, optionally the distances of the respective first and last position readings of a set $S_n$ from the respective neighboring end points of the road segment $s_n$ can be taken into consideration, as is shown by way of example in road segment $s_1$ for the segment boundaries $p_{s1+a}$, $P_{s1+b}$ thereof: the distance $a_A$ of the first position reading $p_1$ of set $S_n$ from the nearest segment boundary $p_{s1A}$ and the distance $a_B$ of the last position reading $p_5$ from the nearest segment boundary $p_{s1B}$ are additionally considered here in the path length $l'_1$, which is to say:

$$l'_1 = a_A + a_1 + a_2 + a_3 + a_B$$

or in general terms for road segment n and with the OBU-specific index r:

$$l'_{n,r} = a_{A,n,r} + \sum_i a_{i,n,r} + a_{B,n,r}$$

To this end, the distances $a_A$ and $a_B$ from the segment boundaries $p_{s1A}$ and $p_{s1B}$ can be calculated both as the shorted point distances (as shown for $a_A$) and as normal distances (as shown for $a_B$).

The distances $a_1$, $a_2$ and $a_3$, or in general terms a (including $a_A$, $a_B$), can be determined directly based on the geometric distances of the position readings $p_1$, $p_2$, $p_4$ and $p_5$ (or the respective segment boundaries $p_{snA}$, $P_{snB}$), which is to say $$a_i \triangleq (p_{i+1} - p_i).$$

If the onboard unit $O_r$ has also generated a related pair $(g_i, t_i)$ comprising speed $g_i$ and measuring time $t_i$ for every position reading p for example with the aid of the satellite navigation receiver 6, the distances $a_1$, $a_2$ and $a_3$ can alternatively also be determined based on the speeds $g_1$, $g_2$ and $g_4$ and the respective differences of the measuring times $t_1$, $t_2$, $t_4$ and $t_5$ of the position readings $p_1$, $p_2$, $p_4$ and $p_5$, which is to say in the form of $$a_i \triangleq g_i \cdot (t_{i+1} - t_i).$$

In the present example, the set quality index $Q_1$ of set $S_1$ was formed as an average of the position quality indices $q_i$ of the position readings $p_i$ included in set $S_1$. The lengths $l'_3$ and $l'_4$ for sets $S_3$ and $S_4$ were determined in the same manner.

However, if in comparison step 20 the set quality index $Q_n$ does not reach the second threshold value $\sigma_2$, the OBU $O_r$ does not generate a path length $l'_n$ for the road segment $s_n$ that the OBU determined itself. This, in turn, is shown in FIG. 8 by way of example for road segments $s_2$ and $s_5$ and for sets $S_2$ and $S_5$, the set quality indices $Q_2$ and $Q_5$ of which did not reach the threshold value $\sigma_2$. In the case of set $S_2$, for example, the number A of position readings $p_i$ included in set $S_2$ fell below a minimum number (here: four), and in the case of set $S_5$, the relative number $A = 4/7$ (four out of a total of seven position readings $p_i$ were considered) was below the second threshold value $\sigma_2$.

In a simplified embodiment of the method section of FIG. 4a, of course, the comparisons to the threshold values $\sigma_1$ and $\sigma_2$, and thus steps 19 and 20, can be eliminated; in the simplest case, only the position readings $p_i$ that can be associated with a road segment $s_n$ of the digital road map 1' are associated with this road segment $s_n$ as a set $S_n$ and, based thereon, in step 21 the path length $l'_n$ (more precisely: $l'_{n,r}$) of road segment $s_n$ measured by the OBU $O_r$ is determined FIG. 4b shows the further phase of updating the digital road map 1' taking into consideration the path lengths $l'_n$ determined by two or more OBUs $O_r$ for one and the same road segment $s_n$ according to FIG. 4a, hereafter provided with the OBU-specific index r, which is to say hereafter denoted by $l'_{n,r}$. The method section of FIG. 4b is advantageously carried out centrally, for example in the central unit 11 or a proxy provided upstream thereof, because in a first step 22 first the path lengths $l'_{n,r}$ determined by the various OBUs $O_r$ for a road segment $s_n$ are collected (received). The method section of FIG. 4b can, for example, be carried out or repeated at predetermined times, for example once or several times a day, week or month, or after a particular number of path lengths $l'_{n,r}$ are collected for a road segment $s_n$.

If the method section of FIG. 4a takes place remotely in one of the OBUs $O_r$, these can transmit the determined path lengths $l'_{n,r}$ via the mobile communication network 10, for example (arrow 23). If the method sections of FIG. 4a are carried out centrally for all OBUs $O_r$, for example in the central unit 11 or a proxy provided upstream thereof, the OBUs $O_r$ could, for example, also optionally transmit only the position readings $p_i$ thereof (and optionally the position quality indices $q_i$ thereof) via the mobile communication network 10, which is to say the data path 24 takes place via the mobile communication network 10.

After the data collection or reception step 22 of FIG. 4b, in step 25 an average path length $\overline{l'_n}$ is calculated using $$\overline{l'_n} = \frac{1}{R} \sum_{r=1}^{R} l'_{n,r}$$

where

R . . . is the number of OBUs $O_r$.

The average path length $\overline{l'_n}$ is thus the average value of the path lengths $l'_{n,r}$ measured by two or more OBUs $O_r$ in the road system 1 for a road segment $s_n$, and more particularly only based on those position readings $p_i$ that exceeded the first threshold value $\sigma_1$ and those sets $S_{n,r}$ that exceeded the second threshold value $\sigma_2$.

A subsequent comparison step 26 is used to check whether the calculated average path length $\overline{l'_n}$ deviates from the segment length $l_n$ that is stored in the digital road map 1' for the road segment $s_n$ by at least one predetermined minimum amount $\sigma_3$. As an alternative or in addition, comparison step 26 can also be used to check whether the calculated average path length $\overline{l'_n}$ deviates from the stored segment length $l_n$ by no more than a predetermined maximum amount $\sigma_4$. If so (branch "y" of step 26), the segment length $l_n$ stored in the digital road map 1' for the road segment $s_n$ is corrected or updated, which is to say the calculated average path length $\overline{l'_n}$ is stored as the new segment length $l_n$ of road segment $s_n$ in the digital road map 1' (step 27).

If no significant deviation exists, which is to say one that exceeds the minimum amount $\sigma_3$ (branch "n" of step 26), the segment length $l_n$ stored in the digital road map 1' remains untouched.

Thereafter, the updated road map 1', comprising the updated segment lengths $l_n$ of the road segments $s_n$, can again be used to calculate a path length traveled by a vehicle $A_r$ by way of map matching, and more particularly both for vehicles $A_r$ or OBUs $O_r$ which just contributed to updating the road map 1' and for other ("third") vehicles $A_r$ or OBUs $O_r$. To this end, the position readings $p_i$ generated by an OBU $O_r$ of a vehicle $A_r$ are again associated with the respective nearest road segments $s_n$ of the digital road map 1' (to the extent this has not already been done in step 18), and the corresponding segment lengths $l_n$ of the road segments $s_n$ that are considered as having been driven on are added to form a total path length $$l_r = \sum_n l_{n,r}$$

traveled by the vehicle $A_r$. The traveled path length $l_r$ thus added is more accurate than before the digital road map 1' was updated and also takes into consideration short-cuts, detours, "cut curves" as well as temporary alternative routes, construction sites or the like in the road system 1 used predominantly by vehicles.

Conclusion

The invention is not limited to the shown embodiments, but encompasses all variants, combinations and modifications that are covered by the scope of the accompanying claims. While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the described embodiments should not be limited by any of the above-described exemplary embodiments, but should be defined only in accordance with the following claims and their equivalents.

What is claimed is:

1. A method for updating a digital road map which represents a road system and in which road segments having segment lengths are stored, comprising:
    equipping at least two vehicles moving about in the road system with at least one respective onboard unit generating position readings;
    when a first set of position readings of a first onboard unit can be associated with a road segment of the digital road map, determining a first path length traveled in the associated road segment based at least on mutual distances of consecutive position readings of the first set;
    when a second set of position readings of a second onboard unit can be associated with the same road segment, determining a second path length traveled in the associated road segment based at least on mutual distances of consecutive position readings of the second set;
    calculating an average path length for the road segment based on at least the first and second path lengths; and
    when the calculated average path length deviates from the stored segment length of the road segment by at least a predetermined minimum amount and/or by no more than a predetermined maximum amount, storing the average path length as an updated stored segment length of the road segment in the digital road map.

2. The method according to claim 1, wherein the path length traveled by the first or second vehicle is determined based on at least the updated stored segment length.

3. The method according to claim 1, wherein the path length traveled by a third vehicle is determined based on at least the updated stored segment length if position readings of the third onboard unit of a third vehicle can be associated with the road segment.

4. The method according to claim 1, wherein the respective path length is determined based on the aforementioned mutual distances, plus the distances of the first and last position readings of the respective set from the respective neighboring segment boundary.

5. The method according to claim 1, wherein the position readings are transmitted from the onboard units to a central unit, where the digital road map is stored and updated.

6. The method according to claim 5, wherein the updated digital road map is returned by the central unit to at least one onboard unit.

7. The method according to claim 1, wherein the association of the first and second sets with the road segment is done by locating the respective nearest road segment.

8. The method according to claim 1, wherein the digital road map includes a respective separate road segment for different driving directions on a road, and that the association takes place by locating the respective nearest road segment having the same driving direction.

9. The method according to claim 1, wherein the mutual distances are determined directly based on the position readings.

10. The method according to claim 1, wherein the onboard units generate a related pair comprising a speed and measuring time for every position reading, and the mutual distances of two respective consecutive position readings of an onboard unit are determined based on the speed at the first of the two position readings and the difference of the measuring times of the two position readings.

11. The method according to claim 1, wherein the onboard units also generate a related position quality index for each position reading, and only those position readings are used for determining a path length, the position quality index of which exceeds a predetermined first threshold value.

12. The method according to claim 1, wherein a set quality index is formed based on a number, or on position quality indices, of position readings of an onboard unit that can be associated with a road segment, and that a path length is determined based on these position readings, or these readings are used for calculating the average path length, only if the set quality index exceeds a predetermined second threshold value.

13. The method according to claim 12, wherein the set quality index is determined based on the position quality indices of the set as an average thereof, or as a ratio of the number of position readings that are considered in the set to the number of considered and not-considered position readings.

14. The method according to claim 1, wherein the position readings are generated by way of a satellite navigation receiver of the onboard unit by localization in a satellite navigation system.

15. The method according to claim 14, wherein the satellite navigation receiver issues a related DOP value for each position reading as a basis for the position quality index thereof.

16. The method according to claim 1, wherein the position quality measure of a position reading is generated depending on the distance thereof from the located nearest road segment of the digital road map.

17. The method according to claim 1, wherein the position quality index of a position reading is generated depending on the distance thereof from an expected value, which is formed for the position reading by way of interpolation based on neighboring, or by way of extrapolation based on preceding, position readings.

18. An onboard unit included in a vehicle moving about a road system, the onboard unit comprising:

a memory that stores a digital road map which represents the road system;

a satellite navigation receiver that receives navigation signals used to generate a first set of position readings, wherein the onboard unit generates a related pair comprising a speed and measuring time for every position reading of the first set, and the mutual distances of two respective consecutive position readings of the first set are determined based on the speed at the first of the two position readings and the difference of the measuring times of the two position readings;

a microprocessor configured to associate the first set of position readings with a road segment of the digital road map, and, responsive to an association of the first set of position readings with the road segment of the digital map, to determine a first path length traveled in the associated road segment based at least on mutual distances of consecutive position readings of the first set; and a transceiver configured to transmit the first path length from the onboard unit to be used to update a segment length of the road segment in the digital road map.

19. The onboard unit of claim 18, wherein the onboard unit generates a related position quality index for each position reading, and only those position readings having a related position quality index that exceeds a predetermined first threshold value are used for determining the first path length.

20. An apparatus for updating a digital road map which represents a road system and in which road segments having segment lengths are stored, comprising:

a central unit configured to receive sets of position readings from at least two vehicles moving about in the road system with at least one respective onboard unit generating position readings;

when a first set of position readings of a first onboard unit can be associated with a road segment of the digital road map, the central unit is configured to determine a first path length traveled in the associated road segment based at least on mutual distances of consecutive position readings of the first set;

when a second set of position readings of a second onboard unit can be associated with the same road segment, the central unit is configured to determine a second path length traveled in the associated road segment based at least on mutual distances of consecutive position readings of the second set;

wherein the central unit is configured to calculate an average path length for the road segment based on at least the first and second path lengths; and when the calculated average path length deviates from the stored segment length of the road segment by at least a predetermined minimum amount and/or by no more than a predetermined maximum amount, the central unit is configured to store the average path length as an updated stored segment length of the road segment in the digital road map.

* * * * *